(12) United States Patent
Ozawa

(10) Patent No.: US 8,502,830 B2
(45) Date of Patent: Aug. 6, 2013

(54) IMAGE PROCESSING APPARATUS, IMAGE PROCESSING METHOD, AND STORAGE MEDIUM

(75) Inventor: Shuuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1076 days.

(21) Appl. No.: 12/431,653

(22) Filed: Apr. 28, 2009

(65) Prior Publication Data
US 2009/0267955 A1    Oct. 29, 2009

(30) Foreign Application Priority Data

Apr. 28, 2008 (JP) .................................. 2008-117107

(51) Int. Cl.
*G06T 1/60* (2006.01)
*G06F 15/00* (2006.01)
*G06F 13/00* (2006.01)
*G09G 5/37* (2006.01)
*G09G 5/00* (2006.01)

(52) U.S. Cl.
USPC ........... 345/530; 345/501; 345/537; 345/561; 345/622

(58) Field of Classification Search
USPC ......... 345/536–538, 553, 557, 622, 561–563, 345/581, 592, 606, 630; 711/1, 2, 100
See application file for complete search history.

(56) References Cited

U.S. PATENT DOCUMENTS

| | | | |
|---|---|---|---|
| 5,889,523 A * | 3/1999 | Wilcox et al. | 715/854 |
| 6,101,290 A * | 8/2000 | Easwar et al. | 382/293 |
| 2007/0176938 A1* | 8/2007 | Nagori | 345/543 |
| 2008/0238924 A1* | 10/2008 | Sawazaki et al. | 345/441 |

FOREIGN PATENT DOCUMENTS

| | | |
|---|---|---|
| JP | 09-037062 A | 2/1997 |
| JP | 11-227301 | 8/1999 |
| JP | 2002-361946 A | 12/2002 |

* cited by examiner

*Primary Examiner* — Xiao M. Wu
*Assistant Examiner* — Andrew Shin
(74) *Attorney, Agent, or Firm* — Canon USA Inc IP Division

(57) ABSTRACT

An image processing apparatus is configured to rasterize an object into a bitmap using a first memory and a second memory which can be accessed quicker than the first memory. The image processing apparatus includes an extraction unit configured to extract a plurality of objects to be rasterized on the second memory from a plurality of the objects, and a first combination unit configured to combine a plurality of objects which can be rasterized within capacity of the second memory from among the objects extracted by the extraction unit into an object.

13 Claims, 16 Drawing Sheets

FIG.4
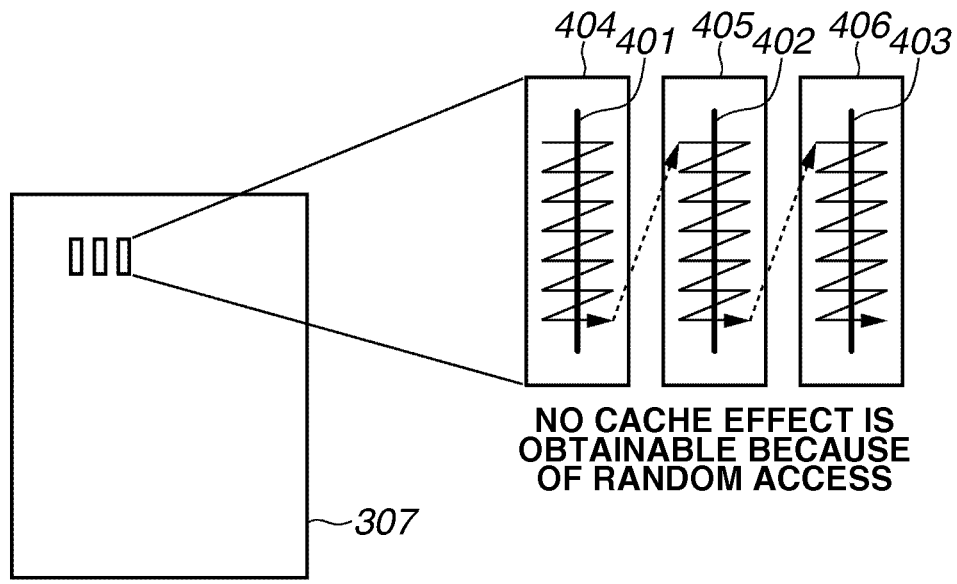
NO CACHE EFFECT IS
OBTAINABLE BECAUSE
OF RANDOM ACCESS
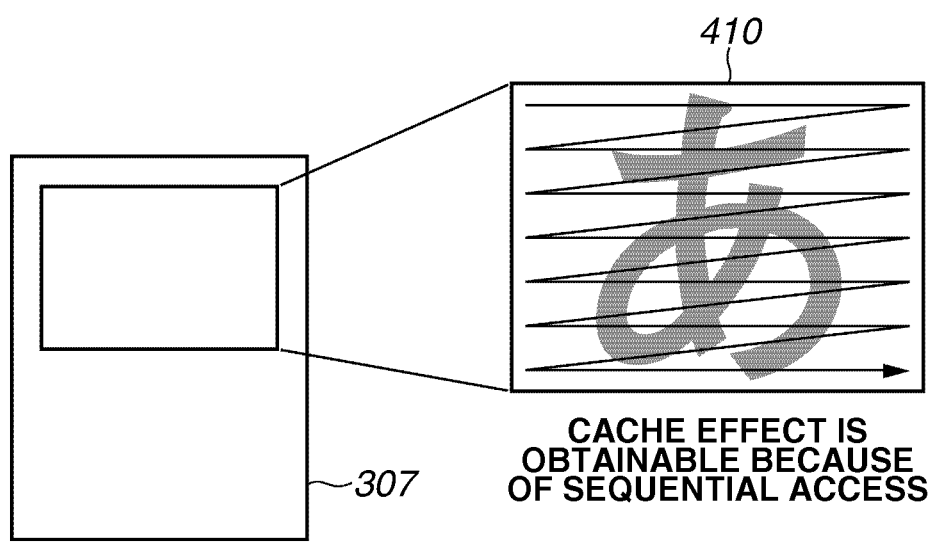
CACHE EFFECT IS
OBTAINABLE BECAUSE
OF SEQUENTIAL ACCESS

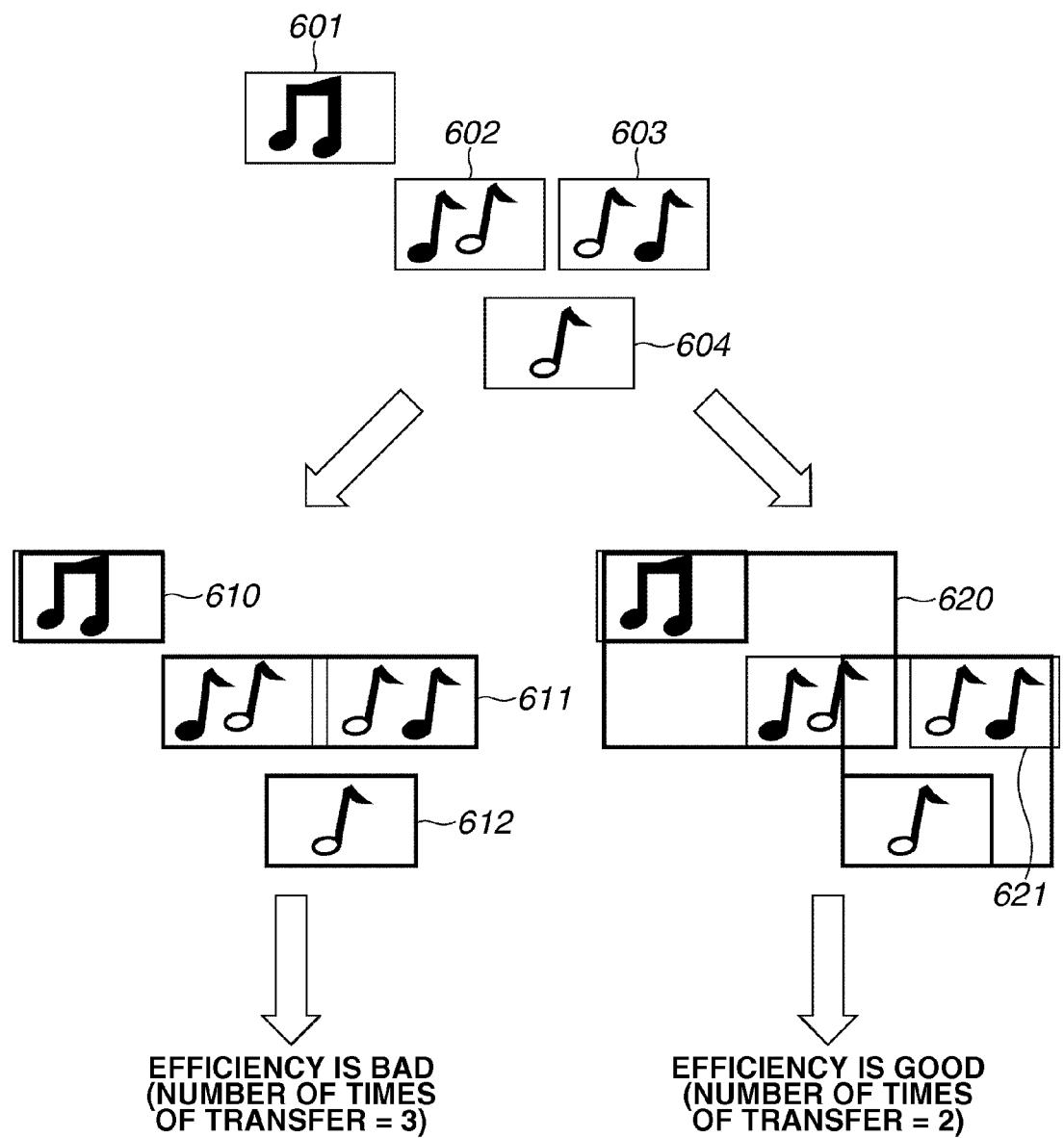

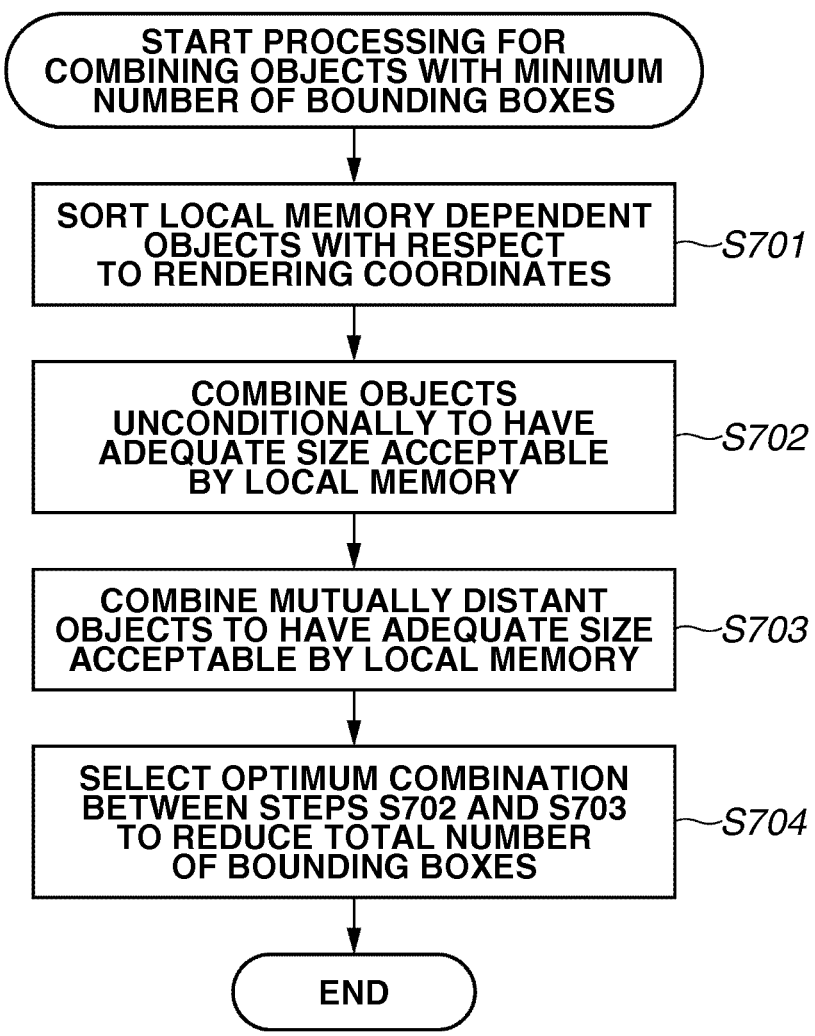

FIG.8
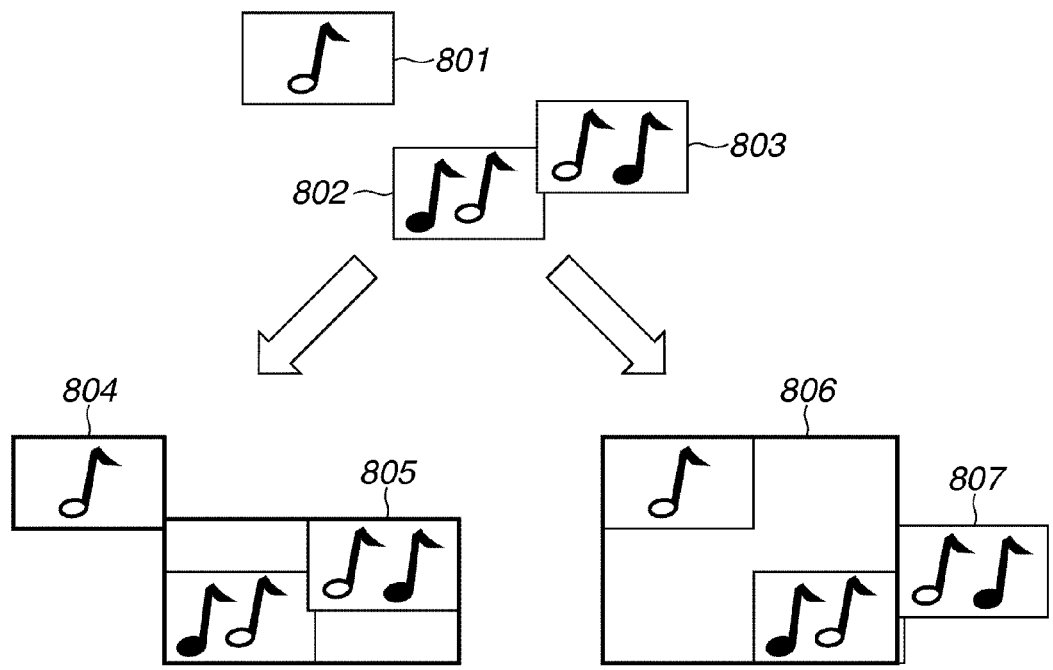
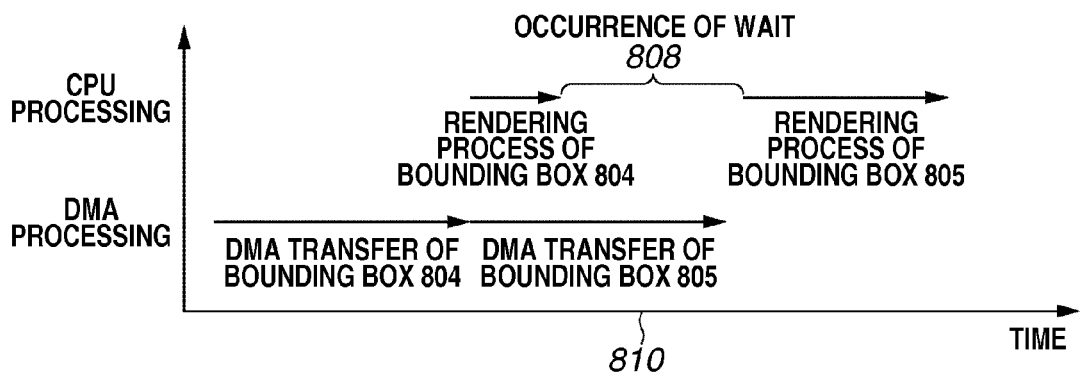
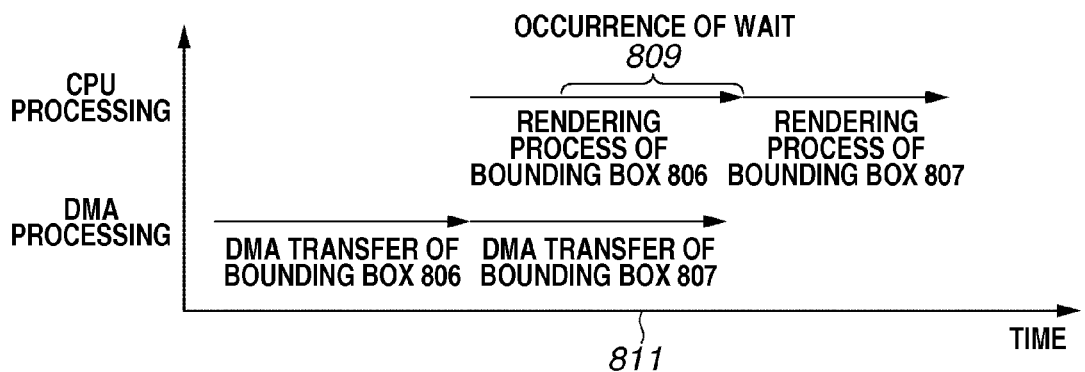

FD/CD-ROM OR COMPARABLE STORAGE MEDIUM

MEMORY MAP OF STORAGE MEDIUM

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus that performs image processing to render an object. More specifically, rasterizing an object into a bitmap.

2. Description of the Related Art

In a recent central processing unit (CPU) equipped in an image processing apparatus, an access speed to a main memory is not so high compared to a speed of internal processing which is greatly increased.

Instead, to compensate for insufficiency in the access speed to the main memory, the CPU can be equipped with a high-speed cache memory. The cache memory has a very small capacity compared to the main memory. Therefore, the cache memory is configured to increase the processing speed based on the principle of locality of reference (LOF), i.e., characteristic of a runtime program that manages the locality of memory access.

This characteristic is based on that a command and its data to be executed immediately after a command and data presently executed are stored in a memory area having an address next to that of the presently executed command and data and sequentially accessed.

However, compared to the program (text) that can maintain higher locality, the data is dependent on respective processing. It is very difficult to assure that the data to be processed next is present in the next address.

Similar situation occurs in a rendering process of PDL data that constitute one page with a plurality of objects.

More specifically, if rendering process (writing) positions, i.e., coordinate positions, of respective objects are distant from each other, their locality is lessened and the access becomes random.

To solve this problem, in addition to the cache memory, the CPU can include a high-speed access memory (hereinafter, referred to as "local memory"). In general, the local memory stores data which is processed in each processing in a format specialized therefor.

As discussed in Japanese Patent Application Laid-Open No. 11-227301, there is a high-speed processing method for rendering PDL data on a local memory, according to which a page is divided into a plurality of bands and stored in the local memory for use in the processing.

However, according to the above-described method, the local memory is required to have capacity sufficient for the bands. The local memory is generally expensive and is not available for a low cost system.

Moreover, if a size of an object is relatively large, the object can maintain higher locality when it is processed for rendering. The local memory needs not to be used for such an object.

According to the conventional method, an object having a large size is also processed for rendering on the local memory. Therefore, transfer processing between the main memory and the local memory may be uselessly performed.

Recently, a multi-functional direct memory access (DMA) circuit could be used for the transfer processing between the local memory and the main memory. However, usability of the functions of the DMA circuit to effectively use the local memory is not considered.

SUMMARY OF THE INVENTION

An embodiment of the present invention is directed to a system capable of rasterizing an object into a bitmap using a first memory and a second memory, according to which an object suitable for the second memory can be efficiently rasterized.

According to an aspect of the present invention, an image processing apparatus is configured to rasterize an object into a bitmap using a first memory and a second memory which can be accessed quicker than the first memory. The image processing apparatus includes an extraction unit configured to extract a plurality of objects to be rasterized on the second memory from a plurality of the objects, and a first combination unit configured to combine a plurality of objects which can be rasterized within capacity of the second memory from among the objects extracted by the extraction unit into an object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 4 schematically illustrates a state of object processing performed by the image processing apparatus according to an exemplary embodiment of the present invention.

FIG. 6 illustrates an example of object processing performed by the image processing apparatus according to an exemplary embodiment of the present invention.

FIG. 7 is a flowchart illustrating an example procedure of second data processing performed by the image processing apparatus according to an exemplary embodiment of the present invention.

FIG. 8 illustrates example processing for generating a bounding box accommodating a plurality of objects, which is performed by the image processing apparatus according to an exemplary embodiment of the present invention.

DETAILED DESCRIPTION OF THE EMBODIMENTS

Figure 1:
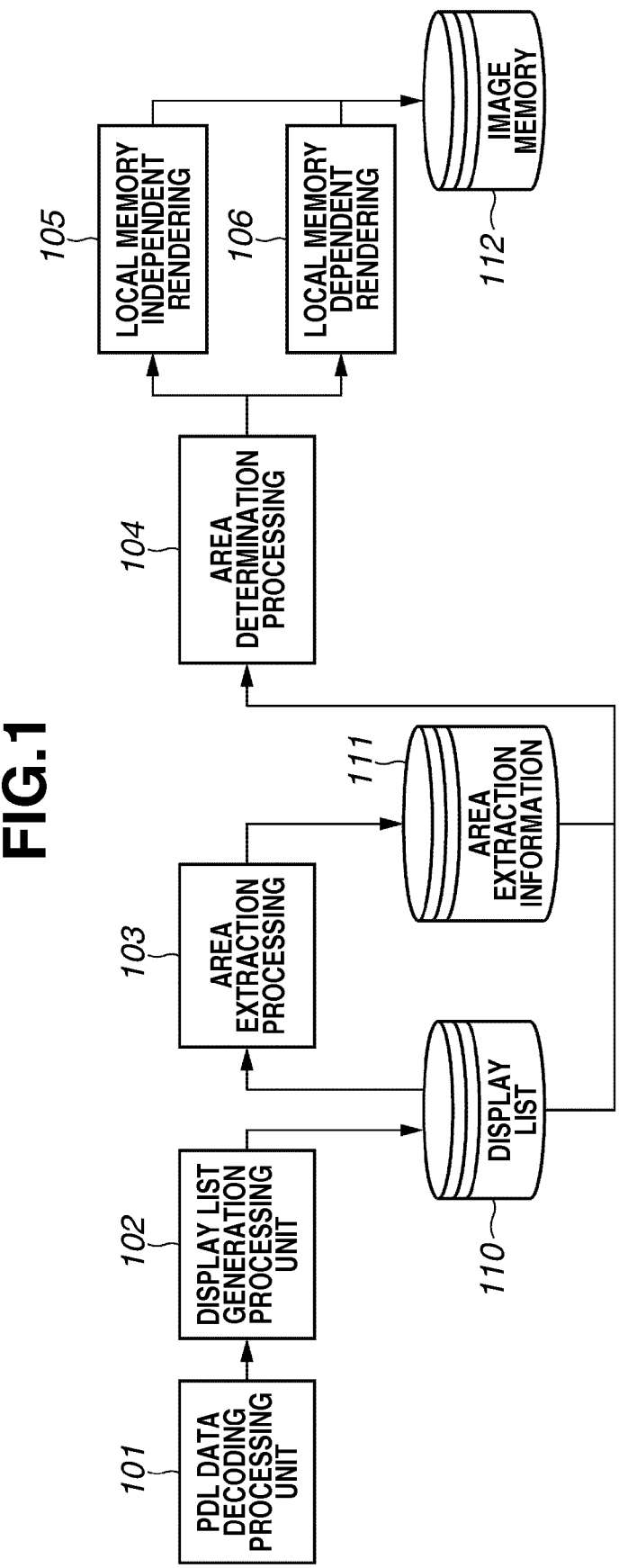
FIG. 1 is a block diagram illustrating an example of data processing performed by an image processing apparatus according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

FIG. 1 is a block diagram illustrating an example of data processing performed by an image processing apparatus according to a first exemplary embodiment the present invention. The example data processing includes analyzing PDL data transferred from an external apparatus and storing rendered image data of a bitmap format in an image memory 112. The image processing apparatus can be configured as an information processing apparatus or can be configured as an internal image processing function of an image forming apparatus. The image processing apparatus includes a main memory that can function as a first memory and a local memory that can function as a second memory, and performs object processing to render an object. In the present exemplary embodiment, the object processing includes processing for rendering using the local memory and the main memory which are provided, for example, in an Application Specific Integrated Circuit (ASIC) when a plurality of objects are included on a page.

In the present exemplary embodiment, the main memory is larger than the local memory in capacity. The local memory is faster than the main memory in an access speed.

In FIG. 1, a PDL data decoding processing unit 101 interprets contents of PDL data transferred from an external apparatus via a network or contents of PDL data stored in the image processing apparatus. The decoding processing unit 101 sends information indicating an interpreted result to a display list generation processing unit 102. In the present embodiment, the decoding processing unit 101 receives PDL data from a printer driver of a host computer (not illustrated). According to another acquisition method, the decoding processing unit 101 can read PDL data from a storage medium.

The display list generation processing unit 102 generates a display list 110 according to the information received from the decoding processing unit 101. Area extraction processing 103 refers to the display list 110 and extracts an object to be subjected to rendering processing on the local memory, and generates area extraction information 111. In the present exemplary embodiment, the local memory is provided in a rendering ASIC as described below.

Area determination processing 104 refers to the area extraction information 111 and determines whether object rendering processing is to be performed by using the local memory or to be performed without using the local memory. If the area determination processing 104 determines that the object rendering processing is to be performed without using the local memory, the object rendering processing is performed on the main memory.

The area determination processing 104 instructs local memory independent rendering 105 or a local memory dependent rendering 106 to execute the object rendering processing based on a result of the above-described determination.

The local memory independent rendering 105 or the local memory dependent rendering 106 performs rendering processing to form an image on the image memory 112 according to the instruction from the area determination processing 104.

As described above, compared to the above-described conventional method, the present exemplary embodiment can effectively use a small-capacity local memory because an object to be processed with the local memory can be discriminated from an object to be processed without using the local memory referring to a determination based on the display list 110.

Figure 2:
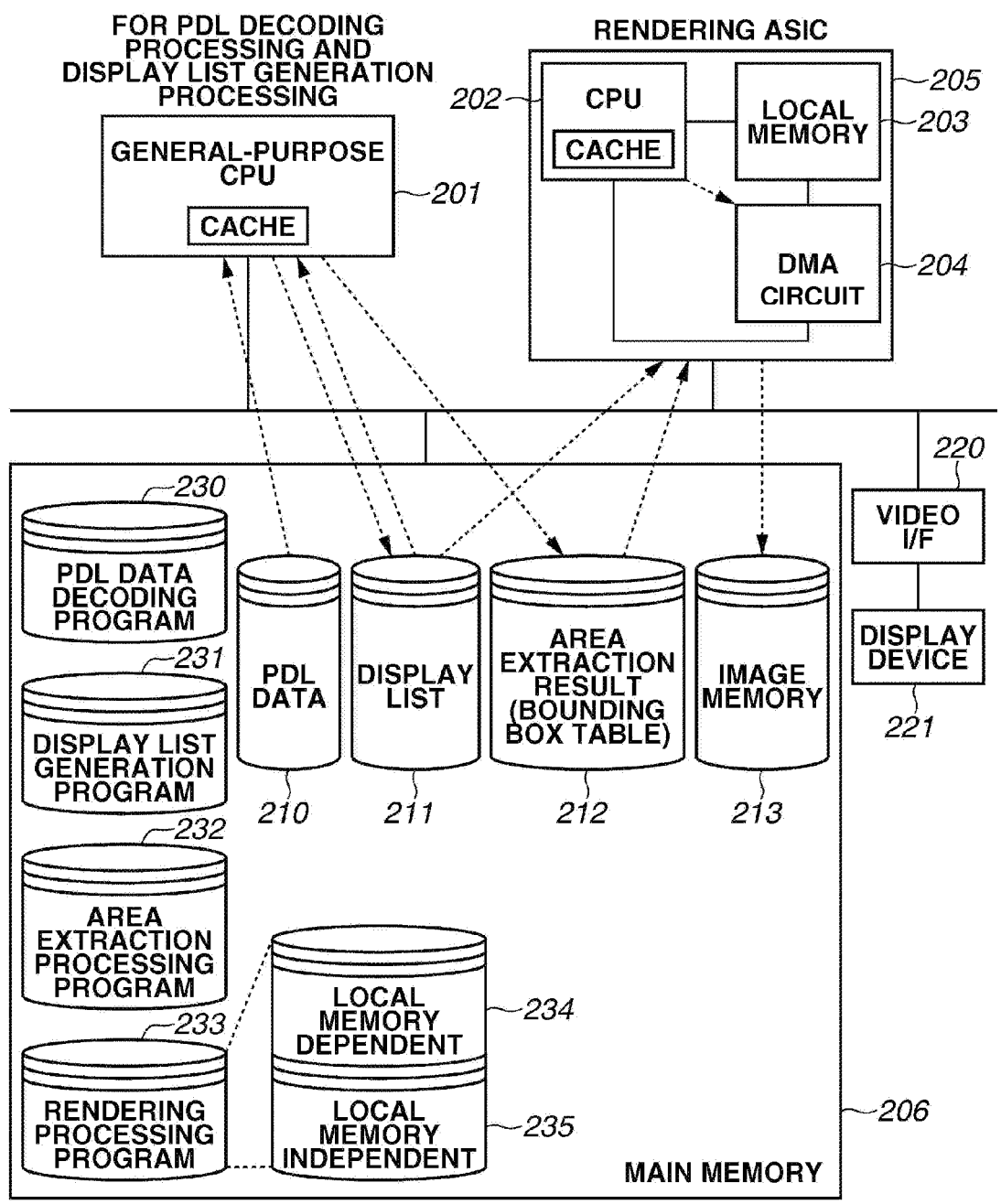
FIG. 2 is a block diagram illustrating an arrangement of the image processing apparatus according to an exemplary embodiment of the present invention.

FIG. 2 is a block diagram illustrating an arrangement of the image processing apparatus according to the present exemplary embodiment. In the present exemplary embodiment, a main memory 206 is constituted by a random access memory (RAM). The main memory 206 includes PDL data 210, a display list 211, and an image memory 213.

A general-purpose central processing unit (CPU) 201, which does not include any local memory, performs processing for generating the display list 211 based on the PDL data 210. The processing for generating the display list 211 based on the PDL data 210 corresponds to the processing performed by the decoding processing unit 101 and the display list generation processing unit 102 illustrated in FIG. 1.

In FIG. 2, a PDL data decoding program 230 and a display list generation program 231 are disposed in the main memory 206.

The general-purpose CPU 201 reads the PDL data decoding program 230 and the display list generation program 231 which are loaded in the main memory 206 and executes PDL decoding processing and display list generation processing.

The CPU 201 converts the display list 211 into an area extraction result (bounding box table) 212 (which corresponds to the processing performed by the area extraction processing 103 in FIG. 1).

An area extraction processing (bounding box generation) program 232 is disposed in the main memory 206. The CPU 201 reads and executes the area extraction processing program 232 to generate the area extraction result 212. For example, the area extraction result 212 generated by the CPU 201 is a bounding box table.

The rendering processing from the display list 211 to the image memory 213 is performed by a rendering ASIC 205. The rendering ASIC 205 includes a CPU 202, a local memory 203, and a DMA circuit 204 that performs data transfer processing between the local memory 203 and the main memory 206. A rendering processing program 233 is involved in the main memory 206, and includes a local memory dependent rendering processing program 234 that uses the local memory 203 or a local memory independent rendering processing program 235 that directly performs rendering processing on the main memory 206.

The CPU 202 of the rendering ASIC 205 reads the local memory dependent rendering processing program 234 to perform rendering processing on each object using the local memory 203 or reads the local memory independent rendering processing program 235 to directly perform rendering processing on the main memory 206, according to the area extraction result (bounding box table) 212 (i.e., according to an output of the area determination processing 104 in FIG. 1).

The above-described processing performed by the CPU 202 corresponds to the processing performed by the area determination processing 104, the local memory independent rendering 105, and the local memory dependent rendering 106 illustrated in FIG. 1.

In this case, the CPU 202 of the rendering ASIC 205 performs processing for directly writing a rendering process result to the image memory 213 of the main memory 206, when the CPU 202 executes the local memory independent rendering processing program 235 to directly render each object on the main memory 206.

The CPU 202 of the ASIC 205 further performs processing for writing the rendering process result to the local memory 203 and notifying its termination result to the DMA circuit 204, when the CPU 202 executes the local memory dependent rendering processing program 234 to render each object using the local memory 203.

The DMA circuit 204 receives the rendering termination notice from the CPU 202 of the ASIC 205 and writes the rendering process result from the local memory 203 to the image memory 213 in the main memory 206.

The DMA circuit 204 has a function of extracting information required for the transfer processing from the area extraction result (bounding box table) 212. If the DMA circuit 204 receives a notice from the CPU 202 that indicates rendering termination timing, the DMA circuit 204 controls memory transfer processing between the main memory 206 and the local memory 203.

An operation of the DMA circuit 204 for controlling the transfer processing between the local memory 203 and the main memory 206 can be performed in parallel with an operation of the CPU 202. Therefore, an overhead of the transfer processing between the main memory 206 and the local memory 203 can be eliminated. The DMA circuit 204 can be constituted by a CPU.

In the present exemplary embodiment, the DMA circuit 204 is configured as a hardware component because of cost reduction.

An image formed on the image memory 213 by the rendering ASIC 205 is sent to a display device 221 via a video interface (I/F) 220. The image is displayed by the display device 221 or output to a printing apparatus, by a print engine, to form a printed image on a recording paper.

In FIG. 2, all programs are stored in the main memory 206 because the CPU can speedily perform the processing. A program in which a lower processing speed is acceptable can be disposed in a read only memory (ROM).

On the other hand, if a higher processing speed is required, some of these programs can be disposed in the local memory 203.

In the present exemplary embodiment, if the local memory 203 is sufficient in capacity, the rendering processing program 233 can be disposed in the local memory 203.

An example operation for causing the DMA and the CPU to perform parallel processing to eliminate the overhead between the local memory and the main memory is described below with reference to FIG. 3.

Figure 3:
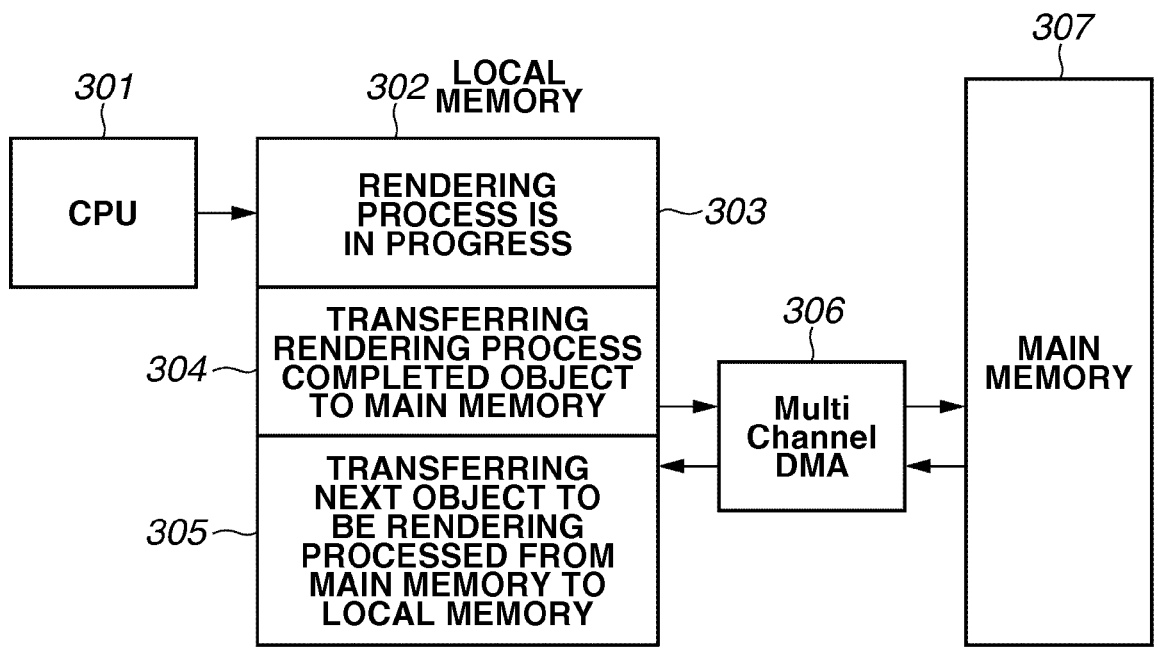
FIG. 3 illustrates example exchange of data between a local memory and a main memory in the image processing apparatus according to an exemplary embodiment of the present invention.

FIG. 3 illustrates example exchange of data between the local memory and the main memory in the image processing apparatus according to the present exemplary embodiment. A main memory 307 corresponds to the main memory 206 illustrated in FIG. 2. A local memory 302 corresponds to the local memory 203 illustrated in FIG. 2.

As illustrated in FIG. 3, in the present exemplary embodiment, the local memory 302 includes three separated areas "1" to "3".

The area "1" is an area 303 where the rendering process of an object is in progress. The area "2" is an area 304 where a rendering process completed object is being transferred from the local memory 302 to the main memory 307. The area "3" is an area 305 where a next object to be subjected to the rendering process is being transferred from the main memory 307 to the local memory 302.

While the CPU 301 is performing the rendering process of one object with the local memory 302, a multi-channel DMA 306 performs memory transfer processing between the main memory 307 and the local memory 302 in parallel.

Through the above-described parallel processing, time for the transfer processing between the main memory 307 and the local memory 302 can be hidden.

Example objects that can be efficiently processed with the local memory 302 and an example object that can be efficiently processed without using the local memory 302 are described with reference to FIG. 4.

FIG. 4 schematically illustrates a state of object processing performed by the image processing apparatus according to the present exemplary embodiment.

In FIG. 4, three objects 401, 402, and 403 are objects that can be efficiently processed with the local memory 302. These objects 401, 402, and 403 are line segments each extending in a vertical direction, whose addresses shift in the vertical direction. Therefore, cache efficiency deteriorates due to jump of memory address.

Hence, the CPU 301 of the rendering ASIC extracts three areas 404, 405, and 406 from the main memory 307 and sends the extracted areas to the local memory 302.

The CPU 301 of the rendering ASIC renders each extracted area on the local memory 302, and returns a rendered result to the main memory 307. The rendering process can be efficiently performed, in this case.

On the other hand, an object 410 illustrated in FIG. 4 is wide in a horizontal direction, the rendering process of which can be performed continuously along the memory addresses (i.e., without jump of memory address). The cache efficiency can be kept high.

Accordingly, if an area of an object to be rendered is narrow, the rendering process of the object can be efficiently performed by using the local memory 302. If an area of an object to be rendered is wide, the rendering process of the object can be efficiently performed without using the local memory 302.

Example processing for increasing the speed in image processing by combining a plurality of objects which can be efficiently processing with the local memory is described below referring to FIGS. 5A and 5B.

Figure 5A:
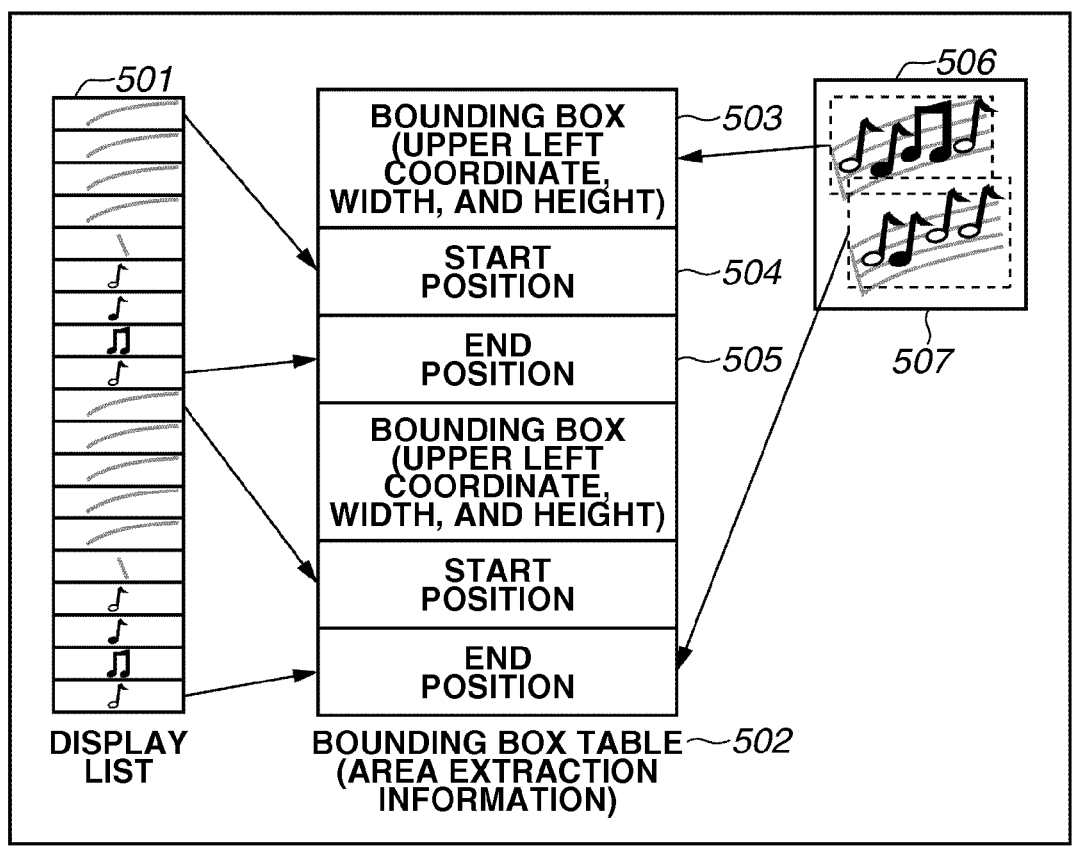
FIG. 5A illustrates an image processing state in the image processing apparatus according to an exemplary embodiment of the present invention.

FIG. 5A illustrates an image processing state in the image processing apparatus according to the present exemplary embodiment. A relationship among a rendering result 507, a bounding box table 502, and a display list 501 is as follows.

As illustrated in FIG. 5A, the display list 501 includes a plurality of objects whose rendering process can be efficiently performed by using the local memory. In the present exemplary embodiment, musical notes are example objects whose rendering process can be efficiently performed by using the local memory. The musical notes are example objects including vertical bars individually, or as a combination, representing length or height of sound. In this respect, the musical notes can be categorized into the objects whose areas to be rendered are narrow.

As illustrated in FIG. 5A, the rendered result 507 includes objects of the display list 501 assembled in a small area. In this case, the rendering process can be efficiently performed by transferring a combined area 506 including a plurality of objects via the DMA transfer circuit, rather than transferring individual objects between the local memory 302 and the main memory 307 as illustrated in FIG. 3.

Therefore, the area extraction processing 103 illustrated in FIG. 1 operates on the CPU 201 illustrated in FIG. 2 to search the display list 501 and generates the bounding box table 502 that includes the plurality of objects.

The local memory 302 to be used for the bounding processing includes a description of rectangle (bounding box) information 503 which defines a position, width, and height of a circumscribed rectangle (bounding box) accommodating the plurality of objects. The local memory 302 further stores a description of a start position 504 and an end position 505 of the display list 501.

The local memory dependent rendering 106 illustrated in FIG. 1 operates on the CPU 202 of the rendering ASIC 205 illustrated in FIG. 2. In this case, before the CPU 202 starts the rendering process of an object indicated by the start position 504, the DMA circuit 204 in FIG. 2 transfers the bounding box table 502 from the main memory 206 to the local memory 203.

Then, the CPU 202 performs the rendering process of all objects disposed in a range defined by the start position 504 and the end position 505 on the local memory 203 as the local memory dependent rendering 106 using the local memory 203.

As described above, no transfer processing between the local memory and the main memory is performed during the rendering process of the plurality of objects. Therefore, the time for the transfer processing can be reduced and efficient rendering processing can be realized.

Figure 5B:
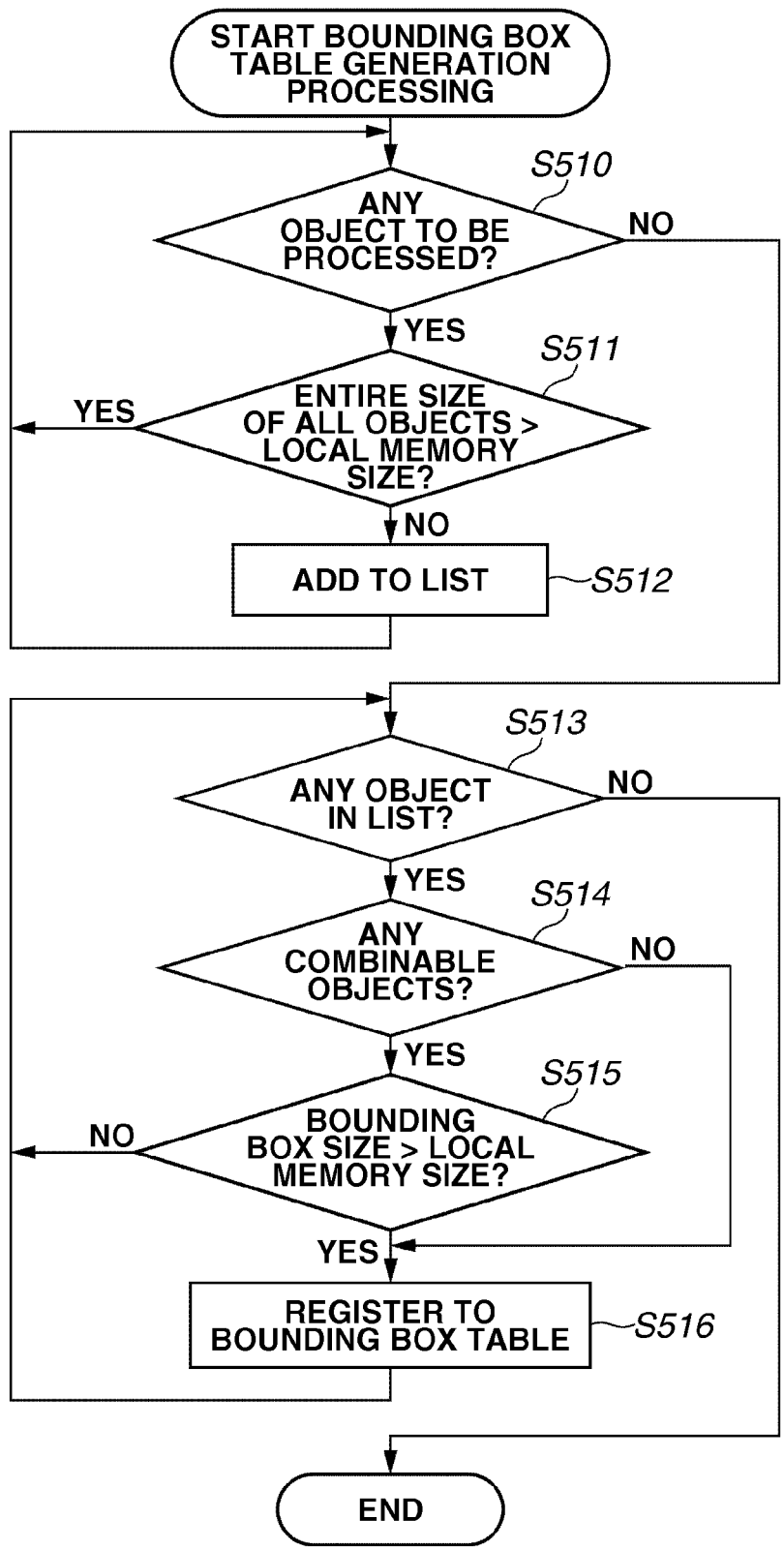
FIG. 5B is a flowchart illustrating an example procedure of first data processing performed by the image processing apparatus according to an exemplary embodiment of the present invention.

FIG. 5B is a flowchart illustrating an example procedure of first data processing performed by the image processing apparatus according to the present exemplary embodiment. The first data processing illustrated in FIG. 5B includes processing for extracting objects to be processed using the local memory which can be performed by the area extraction processing 103, and processing for generating a bounding box accommodating combined objects. Each step represents processing is performed by the area extraction processing 103 illustrated in FIG. 1. The CPU 201 illustrated in FIG. 2 loads the area extraction processing program 232 in the RAM and executes it to realize each step.

In step S510, the CPU 201 determines whether the display list 501 includes any object. If the CPU 201 determines that the display list 501 does not include any object (NO in step S510), the processing proceeds to step S513.

If in step S510 the CPU 201 determines that the display list 501 includes any candidate object (YES in step S510), the processing proceeds to step S511. In step S511, the CPU 201 compares an entire size of all objects with a size of the local memory 203. If the CPU 201 determines that the entire size of all objects is greater than the size of the local memory 203 (YES in step S511), the processing returns to step S510. In this case, i.e., when the entire size of all objects is greater than the size of the local memory 203, nothing is added to the list because the rendering process is directly performed on the main memory without using the local memory.

If in step S511 the CPU 201 determines that the entire size of all objects is not greater than the size of the local memory 203 (NO in step S511), the processing proceeds to step S512. In step S512, i.e., when the entire size of all objects is smaller than the size of the local memory 203, the CPU 201 adds each object to the list to be temporarily used in the rendering process using the local memory 203.

Through the processing performed in steps S510 to S512, all objects to be rendered by using the local memory 203 which are included in the display list 501 are stored in the list generated in step S512. In other words, the objects which can be rasterized within the capacity of the local memory 203 that functions as a second memory is extracted through the steps S510 to S512.

In step S513 and subsequent steps, the CPU 201 performs combination processing and bounding box generation processing on all objects of the list generated in step S512.

First, in step S513, the CPU 201 determines whether any object is stored in the list generated in step S512. If the CPU 201 determines that the list does not store any object (NO in step S513), the CPU 201 terminates the processing of this routine.

If in step S513 the CPU 201 determines that there is an object stored in the list generated in step S512 (YES in step S513), the processing proceeds to step S514.

In step S514, the CPU 201 searches the list generated in step S512 and determines whether combinable objects are present in the list. If the CPU 201 determines that there is no combinable object (NO in step S514), the processing proceeds to step S516.

If in step S514 the CPU 201 determines that there are combinable objects (YES in step S514), then in step S515, the CPU 201 calculates a size of a combined bounding box and compares the calculated size of the combined bounding box with the size of the local memory 203. If the CPU 201 determines that the combined bounding box size is greater than the local memory size (YES in step S515), then in step S516, the CPU 201 registers the bounding box to the bounding box table 502 without combining these objects. Then, the processing returns to step S513.

If in step S515 the CPU 201 determines that the combined bounding box size is less than the local memory size (NO in step S515), the CPU 201 repeats the processing of steps S513 to S515 to check the presence of any other combinable object.

If in step S514 the CPU 201 determines that there is no combinable object, then in step S516, the CPU 201 registers the present bounding box (or one object if there is no combinable object) in the bounding box table 502.

An example method for efficiently generating the bounding box accommodating the plurality of objects, as described with reference to FIGS. 5A and 5B, is described below with reference to FIG. 6.

FIG. 6 illustrates an example of object processing performed by the image processing apparatus according to the present exemplary embodiment.

In FIG. 6, four objects 601, 602, 603, and 604 are musical notes that can be efficiently processed by using the local memory 203 illustrated in FIG. 2.

In FIG. 6, three bounding boxes 610, 611, and 612 are generated as a result of combination based on mutual distances of respective objects 601, 602, 603, and 604. The first bounding box 610 includes only one object 601. The second bounding box 611 includes two objects 602 and 603. The third bounding box 612 includes only one object 604.

On the other hand, according to another combination method, two bounding boxes 620 and 621 can be generated. According to this method, a number of times of the transfer processing between the local memory 203 and the main memory 206 can be reduced and the efficiency is better than the other.

FIG. 7 is a flowchart illustrating an example procedure of second data processing performed by the image processing apparatus according to the present exemplary embodiment. The second data processing is example processing capable of reducing a number of required bounding boxes as illustrated in FIG. 6.

The area extraction processing 103 illustrated in FIG. 1 executes the processing of each step. A processing program described by each step is included in the area extraction processing program 232 illustrated in FIG. 2.

In step S701, the CPU 201 sorts objects that can be efficiently processed on the local memory 203 with respect to their rendering positions, i.e., rendering coordinates of the objects. In step S702, the CPU 201 combines the objects according to a first combination method. The first combination method is an example method for combining the objects unconditionally and simply according to the order of rendering coordinates, to have an adequate size acceptable by the local memory (so that the bounding box size is smaller than the local memory).

In step S703, the CPU 201 combines the objects according to a second combination method. The second combination method is an example method for combining mutually distant objects (whose distance is greater than a predetermined value).

In step S704, the CPU 201 selects an optimum combination (which can minimize the number of bounding boxes) between the results obtained by the above-described first and second combination methods, and terminates the processing of this routine.

Another method for efficiently generating the bounding box accommodating the plurality of objects, as described with reference to FIGS. 5A and 5B, is described below with reference to FIG. 8, as an example different from that described with reference to FIG. 6.

FIG. 8 illustrates example processing for generating the bounding box accommodating the plurality of objects which is performed by the image processing apparatus according to the present exemplary embodiment.

In FIG. 8, three objects 801, 802, and 803 are objects that can be efficiently processed on the local memory 203.

The rendering process of the object 801 requires relatively short time, while the rendering process of the objects 802 and 803 requires relatively long time. If the objects 801 to 803 are combined based on mutual distances of rendering coordinates in rendering process, two bounding boxes 804 and 805 are generated. Time for the rendering process of the bounding box 804 is shorter than that of the rendering process of the bounding box 805.

In the present exemplary embodiment, the rendering process can be efficiently performed because the rendering process can be performed in parallel with the transfer processing between the local memory 203 and the main memory 206 performed by the DMA circuit 204.

According to an example illustrated in a timing chart 810, a wait 808 occurs because of presence of a bounding box whose rendering time is short. In this case, the DMA transfer cannot be hidden by the rendering time. The efficiency is low.

According to another example illustrated in a timing chart 811, any wait 809 does not occur because the rendering time of a bounding box 806 and the rendering time of a bounding box 807 are equalized and lengthened a certain amount. In this case, the efficiency can be improved.

According to the present exemplary embodiment, which frequently performs the transfer processing between the local memory 203 and the main memory 206 and performs the rendering processing and the DMA processing in parallel with each other, it is necessary to average the rendering time of respective bounding boxes to set the rendering time sufficiently long.

If the rendering time of a bounding box is short, it can be determined to directly perform rendering processing on the main memory to prevent any occurrence of wait time (i.e., to prevent the efficiency from being lowered).

Example processing for averaging the rendering time of the bounding boxes as illustrated in FIG. 8 is described below with reference to a flowchart illustrated in FIG. 9A. The processing illustrated in FIG. 9A is rendering processing applied to an example object illustrated in FIG. 9B.

Figure 9A:
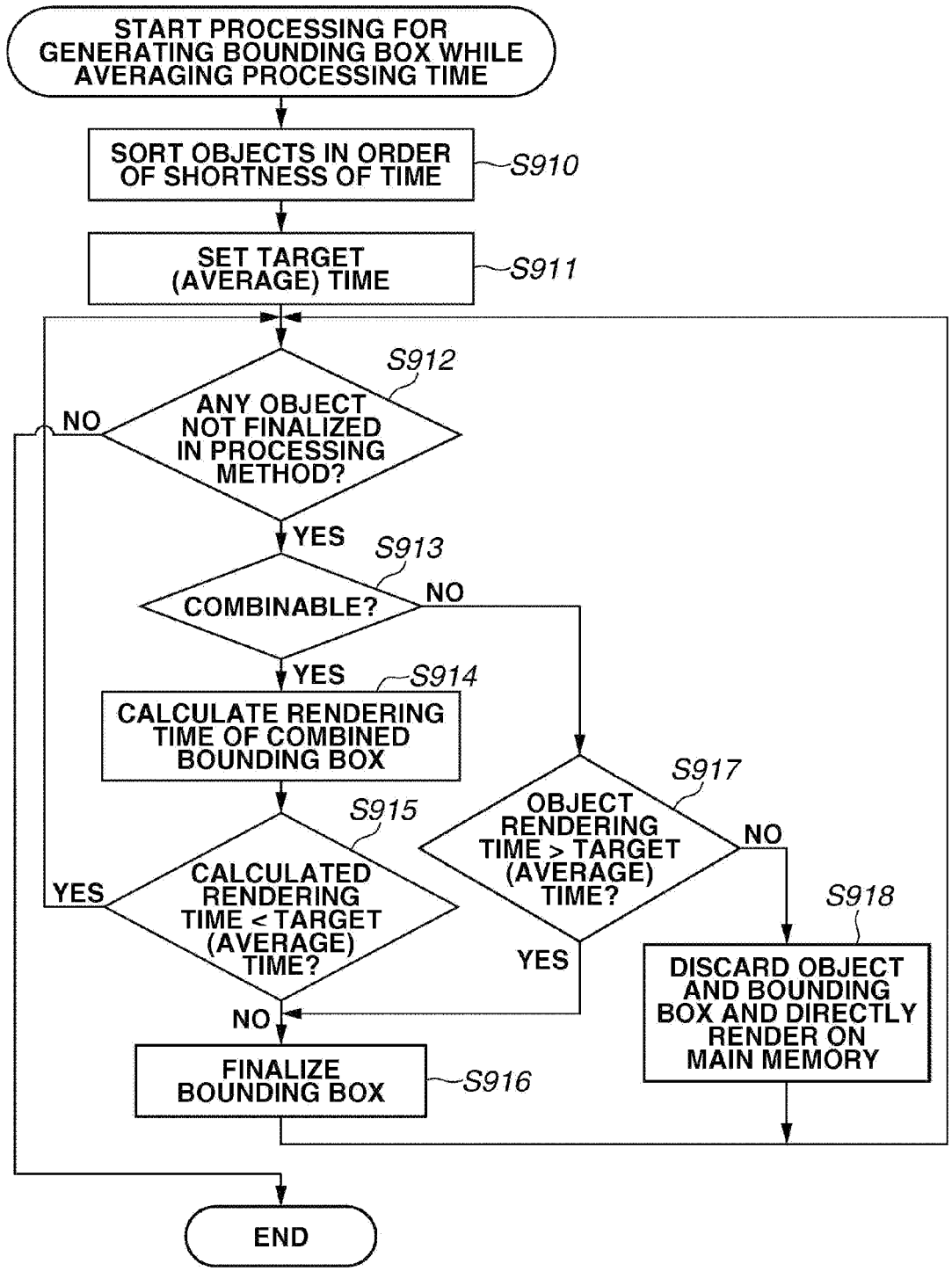
FIG. 9A is a flowchart illustrating an example procedure of third data processing performed by the image processing apparatus according to an exemplary embodiment of the present invention.

FIG. 9A is a flowchart illustrating an example procedure of third data processing performed by the image processing apparatus according to the present exemplary embodiment. The area extraction processing 103 illustrated in FIG. 1 executes the processing of each step. A processing program described by each step is included in the area extraction processing program 232 illustrated in FIG. 2.

Figure 9B:
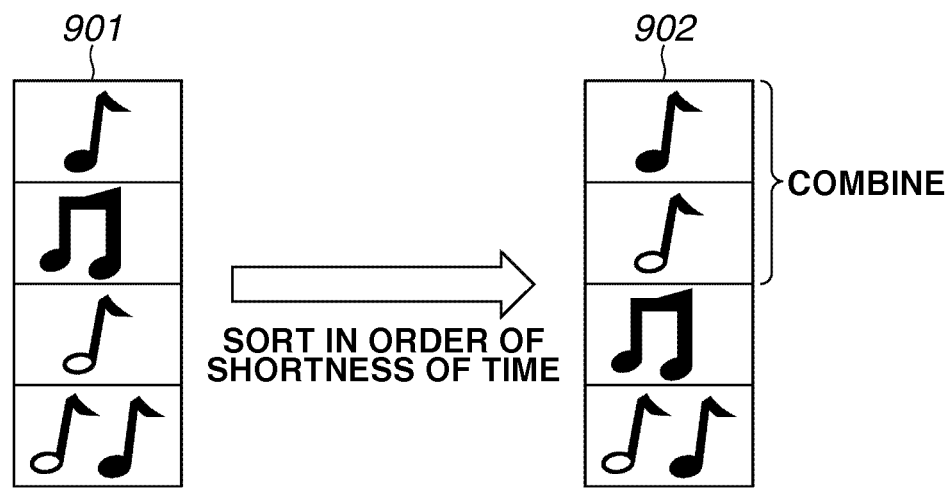
FIG. 9B illustrates example processing for combining a plurality of objects, which is performed by the image processing apparatus according to an exemplary embodiment of the present invention.

As illustrated in FIG. 9B, an object group 901 includes a plurality of objects which have different rendering time. An object group 902 includes the objects sorted (rearranged) in order of shortness in the rendering time. Conceptually, it is desired to combine two or more bounding boxes whose rendering times are short.

In step S910, the CPU 201 sorts the object group 901 in order of shortness in the rendering time. In step S911, the CPU 201 sets a target time required to render an averaged bounding box. If the rendering time of a bounding box is excessively shorter than the target time, it is desired to directly perform rendering processing on the main memory. On the contrary, if there is any combined bounding box whose rendering time is excessively longer than the target time, the efficiency is lowered. This is the reason why the target time is set in the present exemplary embodiment.

All of the objects to be processed in steps S910 and 911 can be selected from the objects that are determined as being speedily processible for rendering using the local memory 203.

In step S912, the CPU 201 determines whether there is any object whose processing method is not finalized. For example, the CPU 201 determines that the processing method is not finalized if determination of a combined bounding box is not yet completed for all objects and if it is not determined whether to perform the rendering process with the local memory 203 or without using the local memory 203. More specifically, the CPU 201 determines that the processing method is finalized if the processing of steps S913 to S915 is completed.

If in step S912 the CPU 201 determines that there is an object not finalized in the processing method (YES in step S912), then in step S913, the CPU 201 determines whether there are any combinable objects. In this case, the object is subjected to the combination processing in order of shortness in the rendering time. On the other hand, there may be objects that cannot be combined together due to the limit of the capacity of the local memory 203. If the CPU 201 determines that there are combinable objects (YES in step S913), then in step S914, the CPU 201 calculates the rendering time of a combined bounding box.

In step S915, the CPU 201 determines whether the rendering time (rasterizing time) of the bounding box calculated in step S914 is shorter than the target time set in step S911. If the CPU 201 determines that the rendering time of the bounding box is shorter than the target time (YES in step S915), the processing returns to step S912 to further identify the presence of any combinable object.

If in step S915 the CPU 201 determines that the rendering time of the bounding box calculated in step S914 is longer than the target time set in step S911 (NO in step S915), the processing proceeds to step S916. In step S916, the CPU 201 finalizes the bounding box and generates the bounding box table 502. Then, the processing returns to step S912. If in step S912 the CPU 201 determines that there is no object not finalized in the processing method (NO in step S912), the CPU 201 terminates the processing of this routine.

If in step S913 the CPU 201 determines that there is not any combinable object (NO in step S913), then in step S917, the CPU 201 determines whether the rendering time of the object is longer than the target time set in step S911. If the CPU 201 determines that the object rendering time is longer than the target time set in step S911 (YES in step S917), the processing proceeds to step S916. If a rendering time of an object itself is longer than the target time, the determination result in step S917 becomes "YES". Then, in step S916, the CPU 201 finalizes the bounding box including only one object.

If in step S917 the CPU 201 determines that the object rendering time is shorter than the target time (NO in step S917), the processing proceeds to step S918. In this case, the rendering time of the object itself or the combined bounding box is shorter than the target time. Therefore, the CPU 201 determines to directly perform the rendering processing on the main memory 206 without using the local memory 203. More specifically, in step S918, the CPU 201 discards the object and the bounding box and directly performs the rendering processing on the main memory 206.

For example, when the rendering time of a combined bounding box is shorter than the target time, or when the object is a single object which is not combinable with other object, the processing proceeds to from step S913 to step S917.

Figure 10:
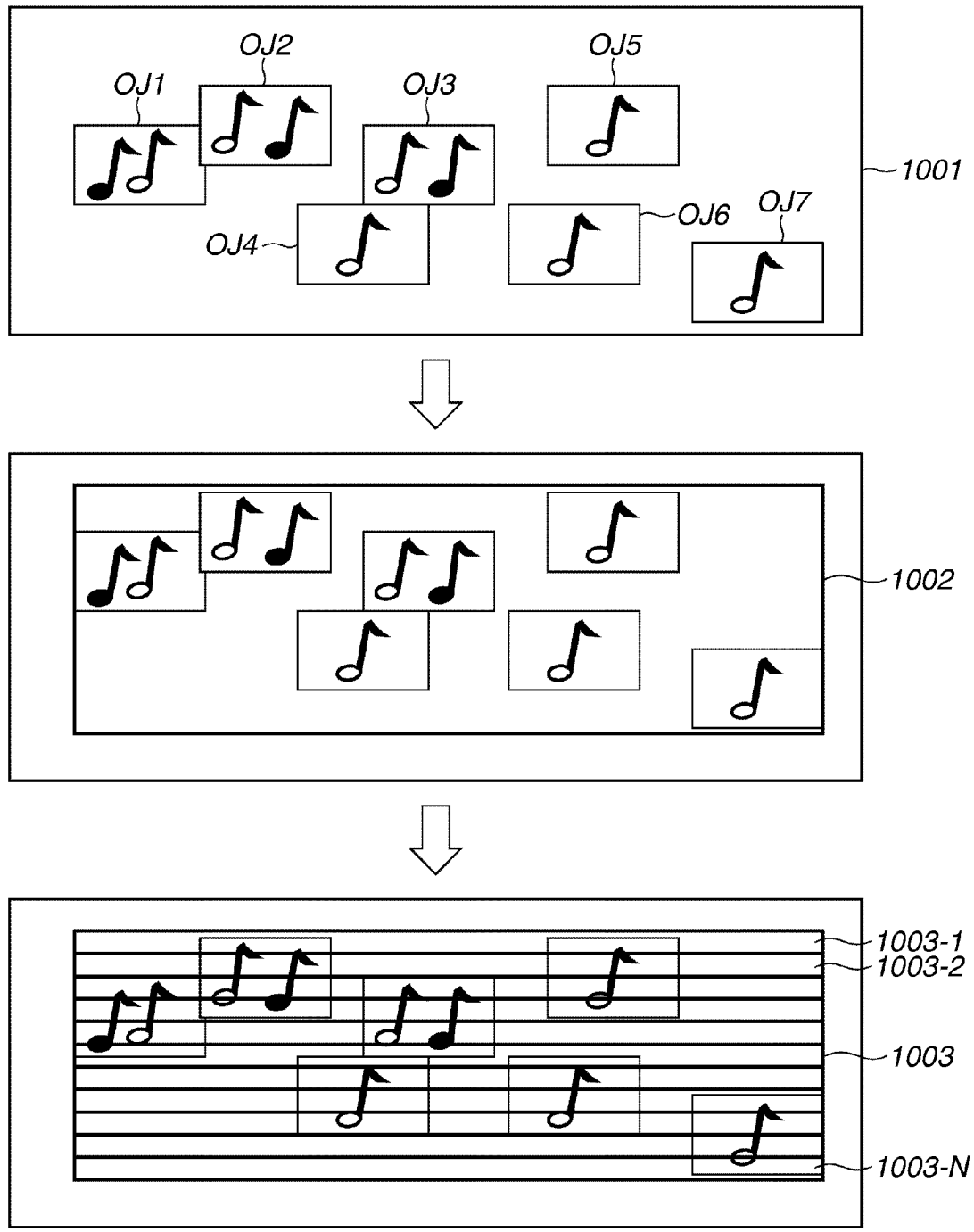
FIG. 10 illustrates bounding box processing performed by the image processing apparatus according to an exemplary embodiment of the present invention.

In the processing for averaging the rendering time of the bounding boxes illustrated in FIGS. 8, 9A, and 9B, there may be some objects that cannot be combined due to randomness of their rendering coordinates. In this case, the CPU 201 can generate an extra-large-size bounding box, which is larger than the local memory 203 as illustrated in FIG. 10. Then, the CPU 201 can divide the generated bounding box into a plurality of sub-boxes arrayed in the vertical direction.

FIG. 10 illustrates bounding box processing performed by the image processing apparatus according to the present exemplary embodiment.

As illustrated in FIG. 10, if there are a plurality of objects OJ1 to OJ7 that cannot be combined due to randomness of their rendering coordinates, the CPU 201 generates a larger bounding box 1002 capable of accommodating these objects included in an object group 1001.

Then, the CPU 201 divides the combined bounding box 1002 into a plurality of bounding boxes 1003-1 to 1003-N, which are arrayed in the vertical direction so as to constitute a bounding box group 1003 having a size acceptable by the local memory 203. The total number N of the divided bounding boxes is determined according to the size of the bounding box 1002.

A second exemplary embodiment of the present invention enables a small-capacity local memory to further speedily operate when a high-function DMA circuit is installed.

The rendering ASIC 205 illustrated in FIG. 2 executes example processing illustrated in FIGS. 11A to 11C, 12, and 13.

FIGS. 11A to 11C and 13 illustrate example rendering processing performed by the image processing apparatus according to the present exemplary embodiment. The rendering processing according to the present exemplary embodiment can be performed by the DMA circuit 204 which has a rotation function.

Figure 11A:
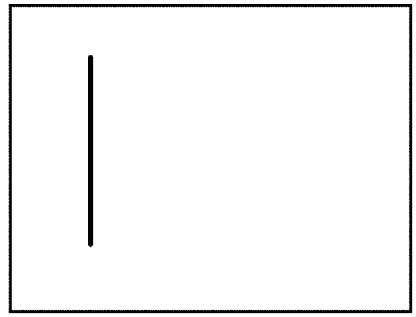
FIGS. 11A to 11C illustrate rendering processing performed by the image processing apparatus according to an exemplary embodiment of the present invention.
Figure 11B:
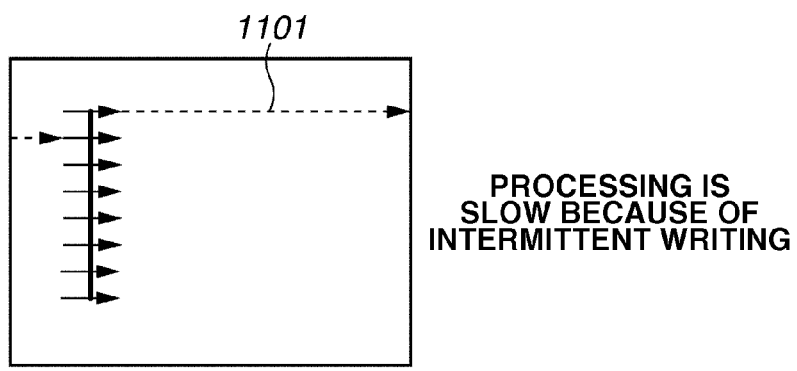

FIG. 11A illustrates a finalized object to be subjected to the rendering processing in which a vertically extending ruled line is rendered. As illustrated in FIG. 11B, a jump of address 1101 occurs if the object to be rendered is the vertically extending line. In this case, the memory access efficiency is low.

According to the above-described conventional method using the local memory 203 divided into a plurality of bands, the jump of address illustrated in FIG. 11B is increased.

Figure 11C:
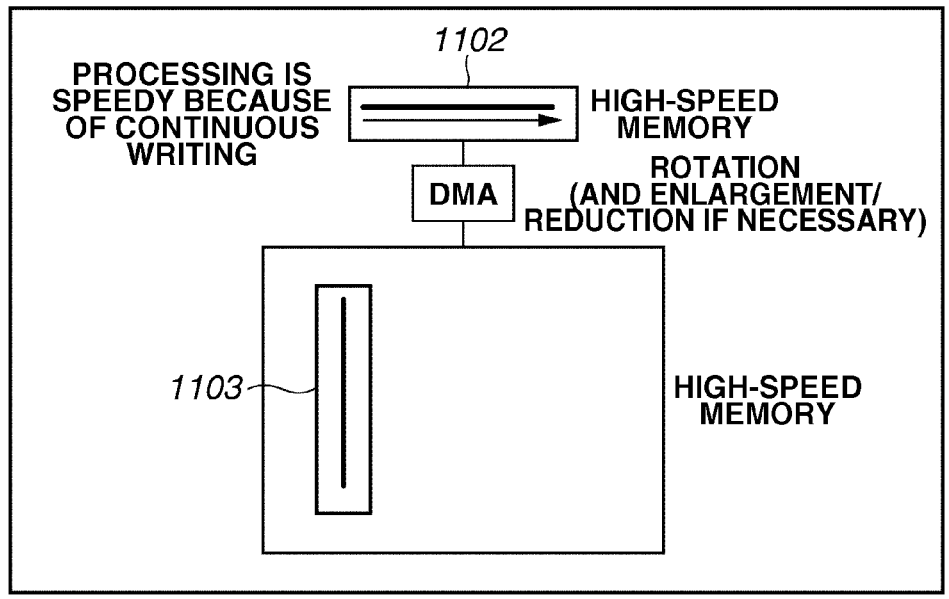

FIG. 11C illustrates example rendering processing realized by the rotation function of the DMA circuit 204.

When the rotation function is available, the DMA circuit 204 can perform rendering processing on a local memory 1102 because the vertically extending ruled line 1103 can be converted into a horizontally extending line. The rendering processing can be speedily performed when the DMA circuit 204 rotates the object to be transferred from the local memory 203 to the main memory 206.

Figure 12:
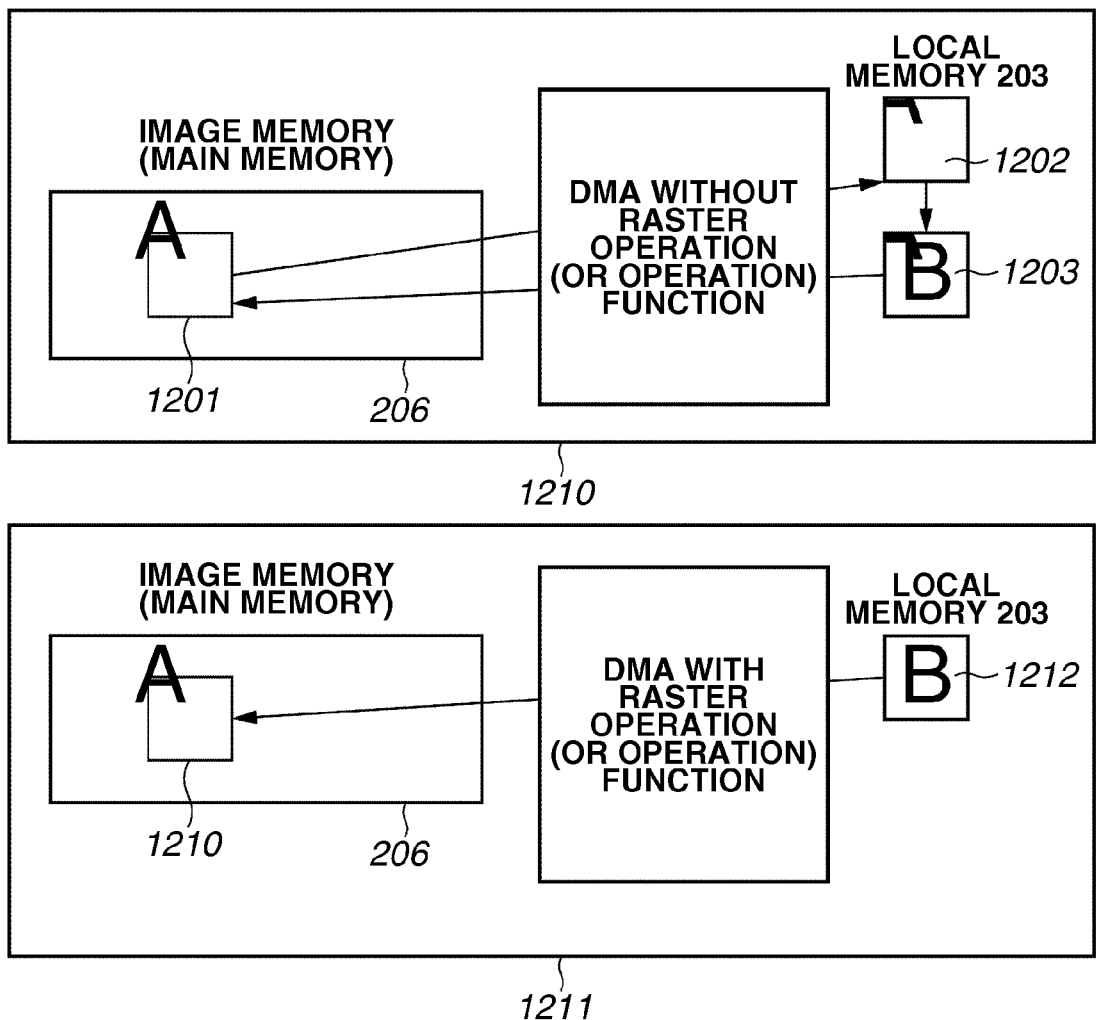
FIG. 12 schematically illustrates rendering processing performed by the image processing apparatus according to an exemplary embodiment of the present invention.

FIG. 12 illustrates an example of the DMA circuit 204 that can perform logical operation processing.

In FIG. 12, example processing 1210 illustrates a case where the DMA circuit 204 has only a simple transfer function. In this case, an area 1201 (part of the letter "A") on the main memory 206 is transferred from the main memory 206 to the local memory 203. A state 1202 indicates an internal state of the local memory 203.

Then, the DMA circuit 204 performs OR operation processing on the local memory 203 to render the letter "B", according to which the local memory 203 is brought into a state 1203 from the state 1202. Then, the DMA circuit 204 writes back the content of the local memory 203 to the main memory 206.

As described above, when the DMA circuit 204 has a simple function, the DMA circuit 204 repetitively performs the transfer processing for reading an object from the main memory and for writing an object to the main memory.

Example processing 1211 illustrates a case where the DMA circuit 204 has a logical operation processing function.

If the logical operation processing function is available, the DMA circuit 204 performs rendering process of the letter "B" on the local memory 203 as indicated by a state 1212. Then, the DMA circuit 204 transfers the rendering result to the main memory 206 while performing OR processing.

As described above, when the DMA circuit 204 has the logical operation function, the DMA circuit 204 needs not to perform the transfer processing for reading an object from the main memory 206 to the local memory 203. Thus, the time required for the transfer processing can be reduced and accordingly the local memory 203 can be efficiently used.

The present processing can be applied to a rendering processing method which takes into consideration a background of a rendering destination such as an alpha blend (semi-transparent image overlay) method in the logical operation processing. The alpha blend is a formation of a semi-transparent image overlay based on coefficients (alpha values) of two images. Determination of the alpha values can be independent of the images. If each pixel of an image has information representing its alpha value, the semi-transparent image overlay can be realized based on this information.

Figure 13:
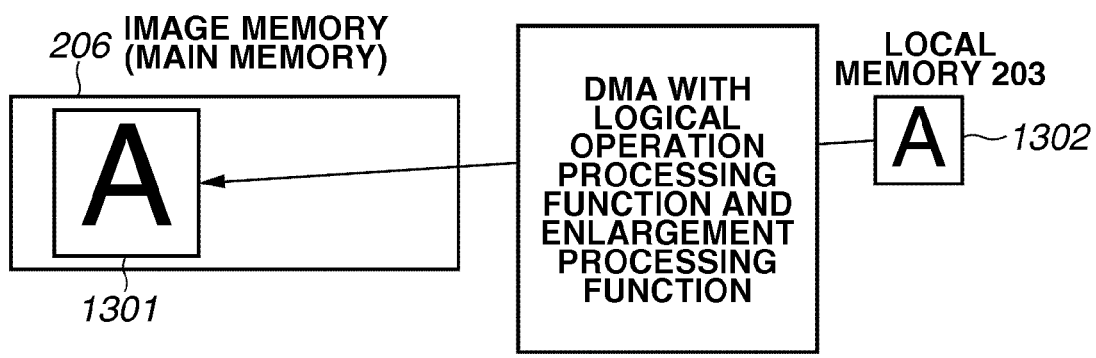
FIG. 13 schematically illustrates rendering processing performed by the image processing apparatus according to an exemplary embodiment of the present invention.

FIG. 13 illustrates an example of the DMA circuit 204 that can use both a logical operation processing function and an enlargement processing function.

The local memory 203 holds a rendering result 1302 of the letter "A" to be enlarged. The DMA circuit 204 performs logical operation processing and enlargement processing on the object and transfers the processed object in a state 1301 to the main memory 206.

In general, an image processing apparatus configured to finally form an image on a recording medium has sufficient resolution for internally generated image data, which is higher compared to that of a host computer.

Therefore, when the image processing apparatus receives an object from the host computer, the image processing apparatus can adequately enlarge the received object and perform rendering processing.

If the DMA circuit 204 has the enlargement processing function, a size of an object to be rendered on the main memory 206 includes a large size that exceeds the capacity of the local memory 203. In other words, the local memory 203 can be efficiently used for the processing.

Figure 14:
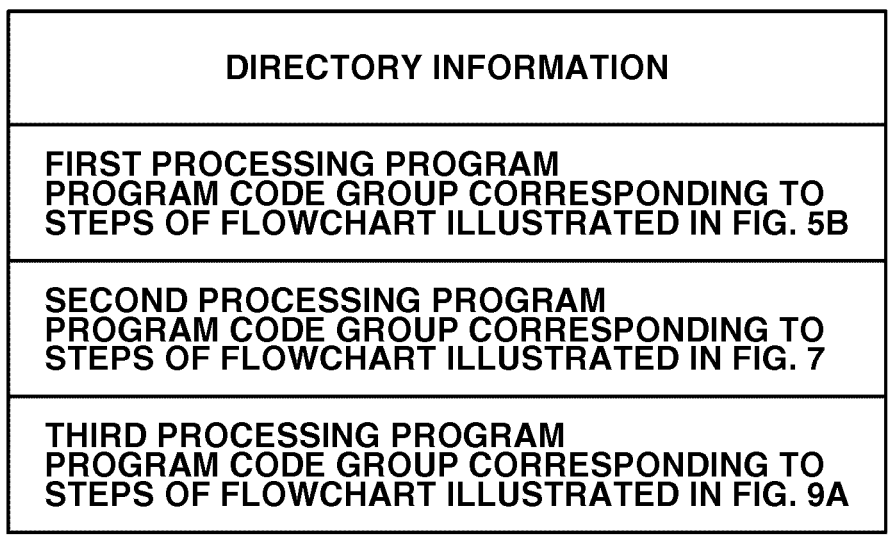
FIG. 14 illustrates a memory map of a storage medium that stores various data processing programs readable by the image processing apparatus according to the present invention.

FIG. 14 illustrates a memory map of a storage medium that stores various data processing programs readable by the image processing apparatus according to the present exemplary embodiment of the present invention.

Although not illustrated in FIG. 14, the storage medium can store management information about the programs stored in the storage medium, such as version information and creator name, as well as information relevant to an operating system (OS) that reads the programs, e.g., icons discriminately displaying the programs.

Further, a directory of the above-described storage medium can manage data belonging to various programs. Moreover, the storage medium can store a program to be used to install various programs on a computer and a decompression program if the installed program is compressed.

A host computer can execute a program installed from the outside to realize the functions indicated in FIGS. 5B, 7, and 9A according to the present exemplary embodiment. In this case, the present invention is applicable when an information group including the program is supplied from an appropriate storage medium (e.g., CD-ROM, flash memory, and FD) or an external storage medium via a network to an output apparatus.

A storage medium storing a software program code for realizing the functions of the above-described exemplary embodiments can be supplied to a system or an apparatus. A computer (or CPU or micro-processing unit (MPU)) in the system or the apparatus can read and execute the program code to realize the functions of the above-described exemplary embodiments.

In this case, the program code itself read out from the storage medium can realize the functions of the present invention. The storage medium storing the program code constitutes the present invention.

Accordingly, equivalents of programs (e.g., object code, interpreter program, and OS script data) are usable if they possess comparable functions.

A storage medium supplying the program includes a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a digital versatile disc (DVD (DVD-ROM, DVD-R)).

In this case, the program code itself read out from the storage medium realizes the functions of the above-described exemplary embodiments. The storage medium storing the program code constitutes the present invention.

The method for supplying the program includes accessing a website on the Internet using a browser of a client computer, and downloading the computer program or compressed files of the programs having automatic installing functions of the present invention to a hard disk or other recording medium of the user. Furthermore, the program code constituting the program of the present invention can be divided into a plurality of files so that respective files are downloadable from different websites. Namely, the present invention encompasses World Wide Web (WWW) servers and File Transfer Protocol (FTP) servers that allow numerous users to download the program files so that their computers can realize the functions or processes according to the present invention.

Moreover, the program of the present invention can be distributed to users by encrypting and storing on a CD-ROM or comparable storage medium. The users who satisfy predetermined conditions are allowed to download key information from a website on the Internet. The users can decrypt the program with the obtained key information and can install the program on their computers.

When the computer reads and executes the installed program, the computer can realize the functions of the above-described exemplary embodiments. Moreover, an OS or other application software running on a computer can execute a part or all of actual processing based on instructions of the programs to realize the functions of the above-described exemplary embodiments.

Additionally, the program code read out from a storage medium can be written into a memory of a function expansion board inserted in a computer or a memory of a function expansion unit connected to the computer. In this case, based on instructions of the program, a CPU provided on the function expansion board or the function expansion unit can execute a part or all of the processing to realize the functions of the above-described exemplary embodiments.

According to the exemplary embodiments of the present invention, in a system configured to rasterize an object into a bitmap using a first memory and a second memory, an object suitable for the second memory can be efficiently rasterized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-117107 filed Apr. 28, 2008, which is hereby incorporated by reference herein in its entirety.

What is claimed is:

1. An image processing apparatus configured to rasterize an object into a bitmap using a first memory and a second memory which can be accessed quicker than the first memory, the image processing apparatus comprising:

an extraction unit configured to extract a plurality of objects to be rasterized on the second memory from a plurality of the objects;

a first combination unit configured to combine a plurality of objects which can be rasterized within capacity of the second memory from among the plurality of objects extracted by the extraction unit into a single object; and a rendering unit configured to render the single object on the second memory and render an object other than the plurality of objects extracted by the extraction unit on the first memory without using the second memory;

wherein the first combination unit includes a determination unit configured to determine whether rasterizing time which is required to rasterize the combined objects on the second memory is shorter than a predetermined target time, and the first combination unit combines a plurality of objects whose rasterizing time is determined longer than the predetermined target time by the determination unit, into an object in a bounding box;

wherein the image processing apparatus further comprises a determining unit configured to determine whether rasterizing time for rasterizing an object which cannot be combined by the first combination unit on the second memory is longer than the target time, wherein if the determining unit determines that the rasterizing time for rasterizing the object on the second memory is longer than the target time, the first combination unit designates the object as an object to be combined into a bounding box.

2. The image processing apparatus according to claim 1, further comprising a second combination unit configured to combine the objects combined by the first combination unit.

3. The image processing apparatus according to claim 2, wherein the second combination unit combines the objects combined by the first combination unit so that a number of times in transferring the rasterized bitmap from the second memory to the first memory can be reduced.

4. The image processing apparatus according to claim 1, wherein the second memory is smaller in capacity than the first memory.

5. The image processing apparatus according to claim 2, wherein the second combination unit combines the objects united by the first combination unit if a distance between the objects is equal to or greater than a predetermined value.

6. The image processing apparatus according to claim 1, further comprising a rasterizing unit configured to rasterize the bitmap on the second memory, wherein the rasterizing unit includes a memory accessing unit configured to perform memory access between the second memory and the first memory.

7. The image processing apparatus according to claim 6, wherein the memory accessing unit performs the memory access between the second memory and the first memory while performing predetermined processing.

8. The image processing apparatus according to claim 7, wherein the predetermined processing includes image processing applied to the bitmap to be rasterized on the second memory, or logical operation processing applied to the bitmap to be rasterized on the second memory.

9. The image processing apparatus according to claim 8, wherein the image processing includes processing for enlarging the bitmap to be rasterized on the second memory, processing for rotating the bitmap to be rasterized on the second memory, and processing for forming a semi-transparent bitmap to be rasterized on the second memory.

10. A method for processing an image in an image processing apparatus configured to rasterize an object into a bitmap using a first memory and a second memory which can be accessed quicker than the first memory, the method comprising:

extracting a plurality of objects to be rasterized on the second memory from a plurality of the objects;

combining a plurality of objects which can be rasterized within capacity of the second memory from among the plurality of extracted objects, into a single object;

rendering the single object on the second memory, and rendering an object other than the plurality of objects extracted by the extraction on the first memory without using the second memory determining whether rasterizing time which is required to rasterize the combined objects on the second memory is shorter than a predetermined target time, and combining a plurality of objects whose rasterizing time is determined longer than the predetermined target time into an object in a bounding box;

determining whether rasterizing time for rasterizing an object which cannot be combined by the combining step with the second memory is longer than the target time, if it is determined that the rasterizing time for rasterizing the object on the second memory is longer than the target time, designating the object as an object to be combined into a bounding box.

11. A computer-readable storage medium storing a computer-executable process, the computer-executable process causing a computer to implement a method for processing an image in an image processing apparatus configured to rasterize an object into a bitmap using a first memory and a second memory which can be accessed quicker than the first memory, the method comprising:

extracting a plurality of objects to be rasterized on the second memory from a plurality of the objects;

combining a plurality of objects which can be rasterized within capacity of the second memory from among the extracted objects into a single object;

rendering the single object on the second memory, and rendering an object other than the plurality of objects extracted by the extraction on the first memory without using the second memory, determining whether rasterizing time which is required to rasterize the combined objects on the second memory is shorter than a predetermined target time, and combining a plurality of objects whose rasterizing time is determined longer than the predetermined target time into an object in a bounding box;

determining whether rasterizing time for rasterizing an object which cannot be combined by the combining step with the second memory is longer than the target time, if it is determined that the rasterizing time for rasterizing the object on the second memory is longer than the target time, designating the object as an object to be combined into a bounding box.

12. The image processing apparatus according to claim 1, wherein the rendering unit transfers the rendered object on the second memory to the first memory.

13. An image processing apparatus configured to rasterize a plurality of pieces of data in a form of display list generated from PDL data into a bitmap using a first memory and a second memory having a access speed faster than the first memory, comprising:

a determination unit configured to determine whether a plurality of pieces of data in the form of a display list to be combined into combined data has a size smaller than a capacity of the second memory;

an extraction unit configured to extract the plurality of pieces of data when the size thereof is determined smaller than the capacity of the second memory;

a combination unit configured to combine the extracted plurality of pieces of data; and a rasterizing unit configured to rasterize the combined data in the form of the display list in the second memory wherein the image processing apparatus further comprises a determining unit configured to determine whether a rasterizing time for rasterizing data which cannot be combined by the combination unit on the second memory is longer than a target time, and wherein if the determining unit determines that the rasterizing time for rasterizing the data on the second memory is longer than the target time, the combination unit designates the data as an combined data.

* * * * *